United States Patent
Zimmer

[11] Patent Number: 5,905,444
[45] Date of Patent: May 18, 1999

[54] ANTI-THEFT SYSTEM FOR A MOTOR VEHICLE

[75] Inventor: Herbert Zimmer, Regensburg, Germany

[73] Assignee: Siemens Aktiengesellschaft, Munich, Germany

[21] Appl. No.: 08/745,499

[22] Filed: Nov. 12, 1996

[30] Foreign Application Priority Data

Nov. 9, 1995 [DE] Germany .......................... 195 41 855

[51] Int. Cl.⁶ .................................................. H04Q 1/00
[52] U.S. Cl. ............................. 340/825.31; 340/825.69; 235/380; 375/334; 70/277; 342/44
[58] Field of Search ........................ 340/825.31, 825.34, 340/825.54, 825.69, 825.72; 235/380; 342/44; 70/277, 278; 375/334

[56] References Cited

U.S. PATENT DOCUMENTS

| | | | |
|---|---|---|---|
| 4,546,241 | 10/1985 | Walton | 235/380 |
| 4,612,509 | 9/1986 | Betts | 375/334 |
| 4,716,376 | 12/1987 | Daudelin | 375/334 |
| 4,719,460 | 1/1988 | Takeuchi | 340/825.31 |
| 4,739,328 | 4/1988 | Koelle | 342/44 |
| 4,818,855 | 4/1989 | Mongeon | 340/825.54 |
| 4,918,955 | 4/1990 | Kimura | 70/277 |
| 4,973,958 | 11/1990 | Hirano | 340/825.69 |
| 5,157,247 | 10/1992 | Takahira | 235/380 |

FOREIGN PATENT DOCUMENTS 44 30 360  10/1995  Germany .

*Primary Examiner*—Brian Zimmerman
*Attorney, Agent, or Firm*—Herbert L. Lerner; Laurence A. Greenberg

[57] ABSTRACT

A transceiver with an antenna oscillating circuit generates a magnetic field which inductively charges a charge capacitor of a transponder through a transponder oscillating circuit. A frequency-modulated oscillation is thereupon generated in the transponder and that oscillation is transmitted back to the transceiver. In order to ensure that the transceiver will receive the highest possible amplitudes of the frequency-modulated oscillation, the resonant frequency of the antenna oscillating circuit is adapted to the oscillation frequencies of the transponder oscillating circuit. To that end, an impedance is connected, automatically weighted, to the antenna oscillating circuit.

7 Claims, 4 Drawing Sheets

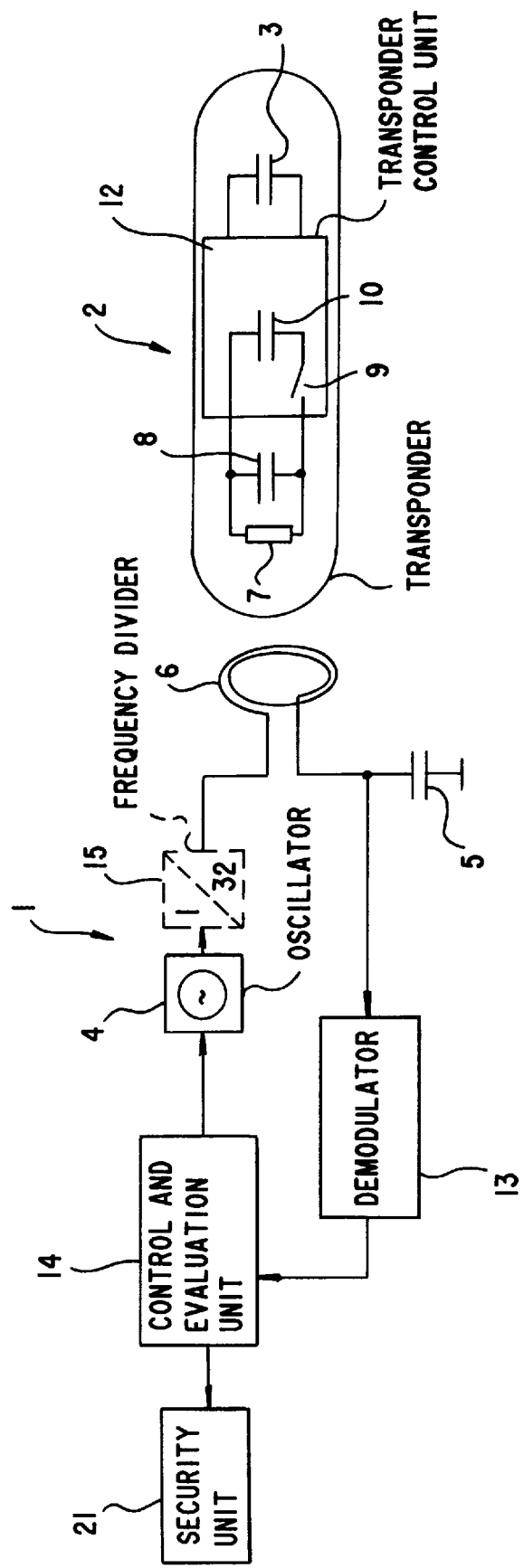

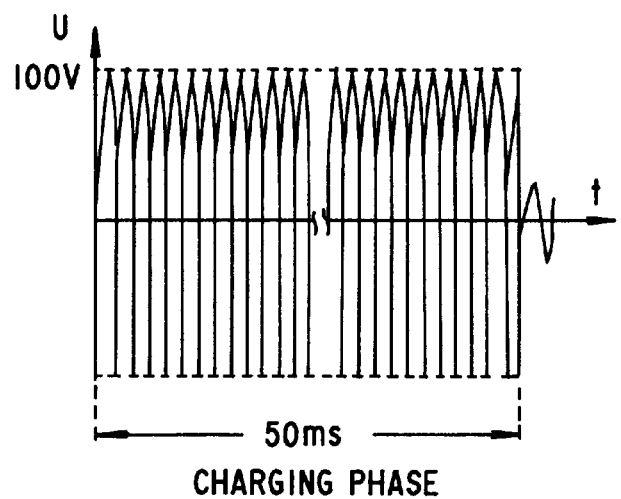
FIG.2a
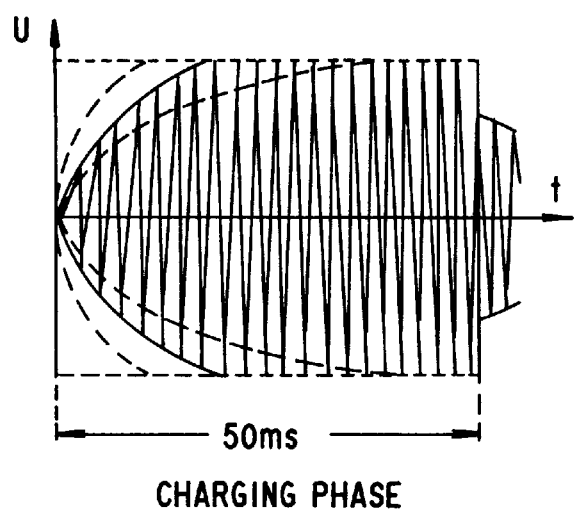
FIG.2b
FIG.3
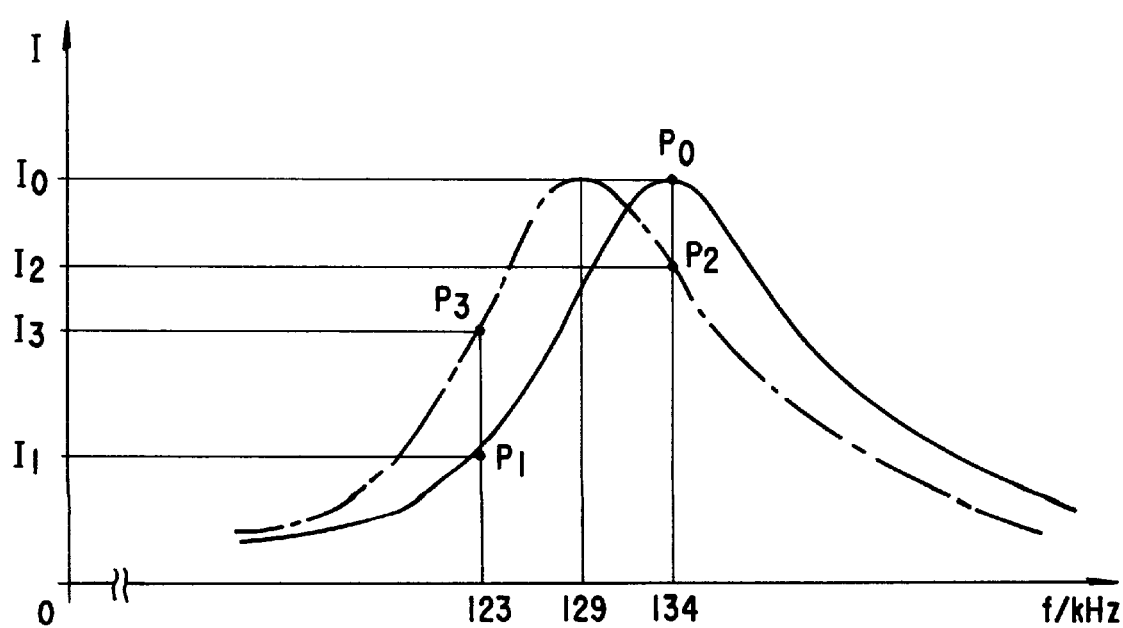

ANTI-THEFT SYSTEM FOR A MOTOR VEHICLE

BACKGROUND OF THE INVENTION

1. Field of the Invention

The invention relates to an anti-theft system for a motor vehicle. In particular, it pertains to a locking system through which an immobilizer of the motor vehicle is released An anti-theft system which is known from German Patent DE 44 30 360 C1 has a portable transponder that carries code information. An antenna disposed in the motor vehicle is part of an oscillating circuit that is amplitude-modulated by an oscillating circuit in the transponder If no modulated oscillation is detected on the vehicle side, then the oscillating circuit is mistuned, so that the next time an attempt is made, a modulated oscillation will be detected That can be carried out by varying the exciter frequency or the resonant frequency of the oscillating circuit.

2. Summary of the Invention

It is accordingly an object of the invention to provide an anti-theft system for a motor vehicle, which overcomes the hereinafore-mentioned disadvantages of the heretofore-known devices of this general type and in which a frequency-modulated transmitted signal of a transponder is detected as well as possible.

With the foregoing and other objects in view there is provided, in accordance with the invention, an anti-theft system for a motor vehicle, comprising a transceiver to be stationarily disposed in a motor vehicle, the transceiver having an antenna oscillating circuit with components including an antenna, the antenna oscillating circuit having a resonant frequency determined by the components; an oscillator imposing an oscillation on the antenna oscillating circuit for transmitting energy signals; a portable transponder having a transponder oscillating circuit oscillating at two different resonant frequencies as a function of code information, the portable transponder having an energy reservoir charged by the energy signals for transmitting the code information back to the transceiver with the aid of the oscillation of the transponder oscillating circuit; an evaluation unit receiving the oscillation generated by the transponder and received by the transceiver, the evaluation unit detecting the received oscillation and outputting the code information; a comparator demodulating and comparing the code information from the evaluation unit with desired code information and issuing a release signal for a security unit if the code information and the desired code information correspond; and the resonant frequency of the antenna oscillating circuit being adapted as a function of the transmission of the energy signals or of the reception of the oscillation to a frequency between the two resonant frequencies of the transponder oscillating circuit.

Accordingly, a transmitter in the vehicle has an oscillating circuit, which is inductively coupled with an oscillating circuit of a portable transponder in a key. In the transmitters a magnetic field or an energy signal is generated and is transmitted to the transponder where it charges the energy reservoir. By discharging the energy reservoir, a frequency-modulated transmitted signal is generated in the transponder and it is transmitted by transformer to the vehicle oscillating circuit. In order to ensure that the transmitted signal or oscillation will be reliably detected, the resonant frequency of the vehicle oscillating circuit is adapted to the resonant frequency of the transponder oscillating circuit, with the aid of an amplifier circuit.

In accordance with another feature of the invention, the antenna of the antenna oscillating circuit is a transmitter coil, the antenna oscillating circuit has capacitor connected parallel to the transmitter coil, and there is provided a circuit configuration, and an impedance connected in weighted fashion through the circuit configuration to the antenna oscillating circuit.

In accordance with a further feature of the invention, the circuit configuration is an amplifier having a voltage gain connecting the impedance in weighted fashion.

In accordance with an added feature of the invention, the circuit configuration is connected parallel to the impedance.

In accordance with a concomitant feature of the invention, the impedance has a series and/or parallel circuit of a capacitor and/or a coil and/or a resistor.

Other features which are considered as characteristic for the invention are set forth in the appended claims.

Although the invention is illustrated and described herein as embodied in an anti-theft system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic and block circuit diagram of the anti-theft system of the invention;

FIGS. 2a–2e are signal graphs of a transponder and a transceiver of the anti-theft system;

FIG. 3 is a graph of a resonance curve of an oscillating circuit; and

DESCRIPTION OF THE PREFERRED EMBODIMENTS

Figure 2C:
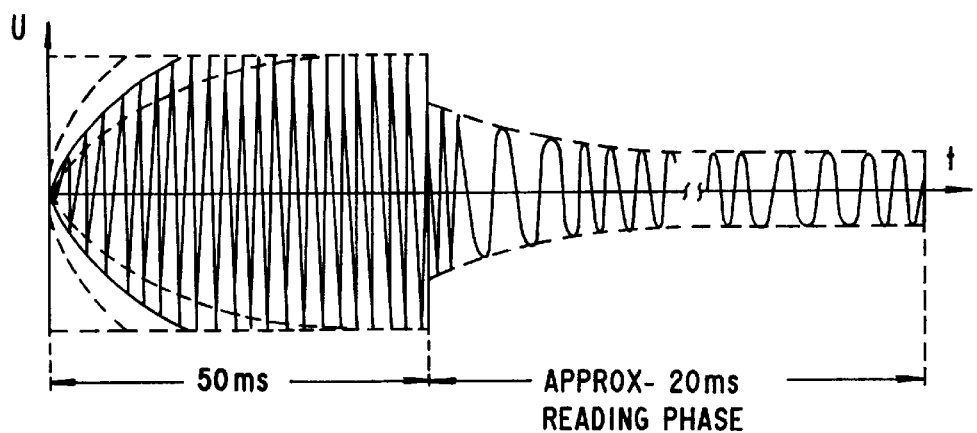

Referring now to the figures of the drawings in detail and firsts particularly, to FIG. 1 thereof, there is seen an anti-theft system according to the invention in which a transceiver 1 disposed in a motor vehicle cooperates with a portable transponder 2 through a transformer-type coupling, if the transponder 2 is located in the vicinity of the transceiver 1. The transceiver 1 generates a magnetic alternating field, by which energy is transmitted to the transponder 2, as a result of which an energy reservoir (referred to below as a charging capacitor 3) in the transponder 2 is charged.

Once sufficient energy has been stored in the charging capacitor 3, the transponder 2 is activated by that energy. The transponder then generates an oscillation that is frequency-modulated at the pace or rate of code information. This oscillation is transmitted as a transmitted signal back to the transceiver 1.

In order to provide energy transmission and retransmission of the transmitted signal, the transceiver 1 has an oscillating circuit (referred to below as an antenna oscillating circuit), which is incited to oscillation at an exciter frequency $f_E$ with the aid of an oscillator 4, in order to generate the energy signals. To that end, the antenna oscillating circuit has at least one antenna capacitor 5 and one coil (antenna 6). The antenna 6 may, for instance, be wound around an ignition key.

The antenna oscillating circuit 5, 6 is compelled by the oscillator 4 which has an exciter variable, to oscillate at the exciter frequency $f_E$. An output voltage or current of the oscillator 4 can be used as the exciter variable. In addition, a frequency divider 15 may be disposed between the oscillator 4 and the antenna oscillating circuit 5, 6, in order to divide the oscillator frequency downward to the desired exciter frequency $f_E$. Energy signals are transmitted to the transponder 2 through the use of the oscillation.

The transponder 2 likewise has an oscillating circuit (referred to below as a transponder oscillating circuit) with a coil 7 and a transponder capacitor 8. If the antenna 6 and the coil 7 are disposed close together, then an inductive transmission of energy occurs from the antenna 6 to the coil 7 and subsequently an inductive transmitted signal retransmission takes place from the coil 7 to the antenna 6.

This is the case, for instance, whenever the transponder 2 is located on an ignition key. As soon as the ignition key is inserted into the ignition lock and the ignition key is turned, the antenna 6 and the coil 7 are electrically coupled to one another.

The oscillation of the transponder oscillating circuit 7, 8 is frequency-modulated at the pace or rate of code information by an auxiliary capacitor 10. To that end, the transponder 2 has a switch 9, which connects the auxiliary capacitor 10 to the transponder capacitor 8 of the transponder oscillating circuit 7, 8 at the pace or rate of the code information.

As a result, a resonant frequency $f_0$ of the transponder oscillating circuit 7, 8 is varied at the pace or rate of the connection and disconnection of the auxiliary capacitor 10, since in each case the total impedance of the transponder oscillating circuit 7, 8 changes.

The switch 9 is controlled by a transponder control unit (transponder IC 12), which may be constructed as an integrated circuit.

As soon as the ignition key is turned in the ignition lock, the transceiver 1 generates the magnetic alternating field with a high field intensity (energy signals seen in FIG. 2a). The energy signals are generated within a predetermined length of time (charging phase), in this case for 50 ms. They have an amplitude of approximately 100 V. These energy signals charge the charging capacitor 3 variously rapidly (FIG. 2b) depending on the degree of coupling between the transponder 2 and the transceiver 1, or in other words depending on the field intensity received by the transponder If the oscillating circuit is of high quality, the charging capacitor 3 is charged rapidly (dotted line in FIG. 2b).

Figure 2D:
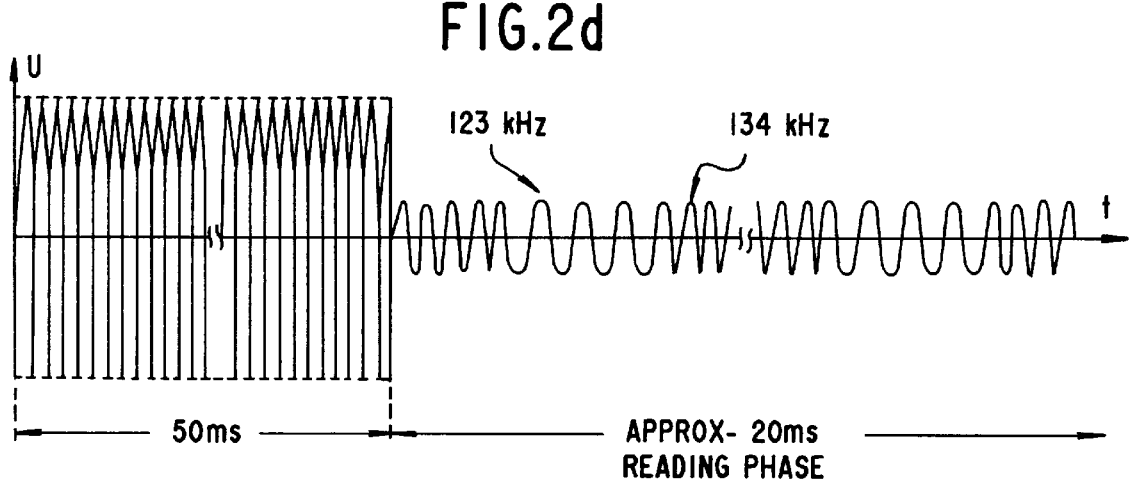

Once the transmission of the energy signals has ended, the signal direction reverses. The transponder 2 then generates a frequency-modulated alternating field. (FIG. 2c), that is the transmitted signal which has only a slight field intensity, and in the antenna 6 generates a corresponding voltage on the order of magnitude of a few millivolts (FIG. 2d), analogous to the code information of the transponder 2 (reading phase).

The transmitted signal (which is also referred to as a code signal) is a signal of slight amplitude, for instance of approximately 1 mV, and it lasts for approximately 20 ms. The amplitude of the code signal decreases continuously, since the charging capacitor 3 furnishes the energy for the transponder oscillating circuit and for switching the switch 9 and is consequently discharged steadily.

The antenna oscillating circuit 5, 6 is tuned in such a way that its resonant frequency $f_{RA}$ is initially about 134 kHz.

The energy signals are transmitted at this frequency to the transponder 2. Due to the frequency modulation, the oscillation of the transponder oscillating circuit 7, 8, 10 oscillates at two different resonant frequencies $f_{RT}$, specifically at about 134 kHz and about 123 kHz, depending on the auxiliary capacitor 10 which is connected.

Figure 2E:
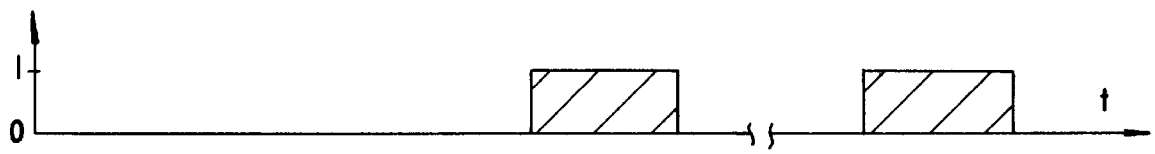

The voltage induced in the antenna oscillating circuit 5, 6 during the reading phase is demodulated by a demodulator 13 and evaluated in a control and evaluation unit 14. To that end, the period length or frequencies of the modulated oscillation are measured. If the frequency of the modulated oscillation is below a threshold value, for instance of 129 kHz, then a logical high state or "1" of the modulated signal is detected, and if the frequency is below 129 kHz, then a logical low state or "0" is detected (FIG. 2e). In this way, the code information of the transponder 2 is demodulated from the frequency-modulated oscillation, that is from the transmitted signal.

The code information is compared with predetermined desired code information in the control or evaluation unit 14. If the two correspond, a release signal is sent to a security unit 15 in the motor vehicle.

Such a security unit 21 may, for instances be a door lock or an immobilizer. If the code signal is authorized and correct, the door lock is unlocked or the immobilizer is deactivated, so that starting of the engine is possible.

Each oscillating circuit has a natural frequency, that is also known as a resonant frequency, $f_R$, which is determined by the total impedance of the components used in the oscillating circuit. In other words, in the antenna oscillating circuit it is determined essentially by the inductance of the antenna 6 and the capacitance of the antenna capacitor 5, and in the transponder oscillating circuit it is determined by the inductance of the coil 7 and the capacitance of the capacitor 8 and optionally the capacitance of the auxiliary capacitor 10.

A generated oscillation intensity I (amplitude) of the transmitted signal received by the transceiver 1 is highest when the antenna oscillating circuit is excited with an exciter frequency $f_E$ that is equal to its resonant frequency $f_{RA}$. The signal intensity is illustrated in terms of a resonance curve in FIG. 3, in which the frequency f is plotted on the abscissa (X axis) and the oscillation intensity I resulting from the exciter variables that is the transponder oscillation transmitted inductively to the transceiver 1, is plotted on the ordinate (Y axis).

If the frequency of the received oscillation of the transponder 2 (that is, the resonant frequency $f_{RT}$) is equal to the resonant frequency $f_{RA}$ of the antenna oscillating circuit 5, 6, then an operating point $P_i$ is at a resonant point $P_0$ (resonance curve in solid lines). Accordingly, the intensity of voltage induced in the antenna oscillating circuit 5, 6 is highest when the resonant frequency $f_{RA}$ of the antenna oscillating circuit 5, 6 corresponds to the resonant frequency $f_{RT}$ of the transponder oscillating circuit 7, 8, 10. If the frequency of the received oscillation of the transponder 2 differs from the resonant frequency $f_{RA}$ of the antenna oscillating circuit 5, 6, then the operating point $P_i$ is below the resonant point $P_0$ and is specifically at an operating point $P_1$. The received intensity $I_1$ of the oscillation is substantially less than the received intensity $I_0$ at the resonant point $P_0$.

Since the resonant frequency $f_{RT}$ of the transponder oscillating circuit 7, 8, 10 alternates between two values because of the connection of the auxiliary capacitor 10, then although the maximum intensity $I_0$ of the voltage is induced at one value (134 kHz=logical low state), nevertheless at the other value (123 kHz=logical high state), only a slight intensity $I_1$ of the voltage is induced (operating point $P_1$). In order for the highest possible intensity of the voltage to be induced in both logical states (operating points $P_2$ and $P_3$ with respective intensities $I_2$ and $I_3$), according to the invention the resonant frequency $f_{RA}$ of the antenna oscillating circuit 5, 6 is shifted (which is equivalent to a shifting of the resonant curve represented by the dotted resonant curve). Specifically, this is carried out in such a way that the resonant frequency $f_{RA}$ is located approximately in the middle between the two values of the resonant frequency $f_{RT}$ of the transponder oscillating circuit 7, 8, 10, in this case as an example resonant frequency $f_{RT}$=129 kHz. Thus the antenna oscillating circuit 5, 6 is approximately equally sensitive for both logical states. This has the advantage moreover that the signal to noise ratio is greater, and thus the transmitted signal of the transponder 2 is reliably demodulated. In order to vary the resonant frequency $f_{RA}$, a weighted variation of the components of the antenna oscillating circuit 5, 6 takes place, in accordance with the invention.

Figure 4:
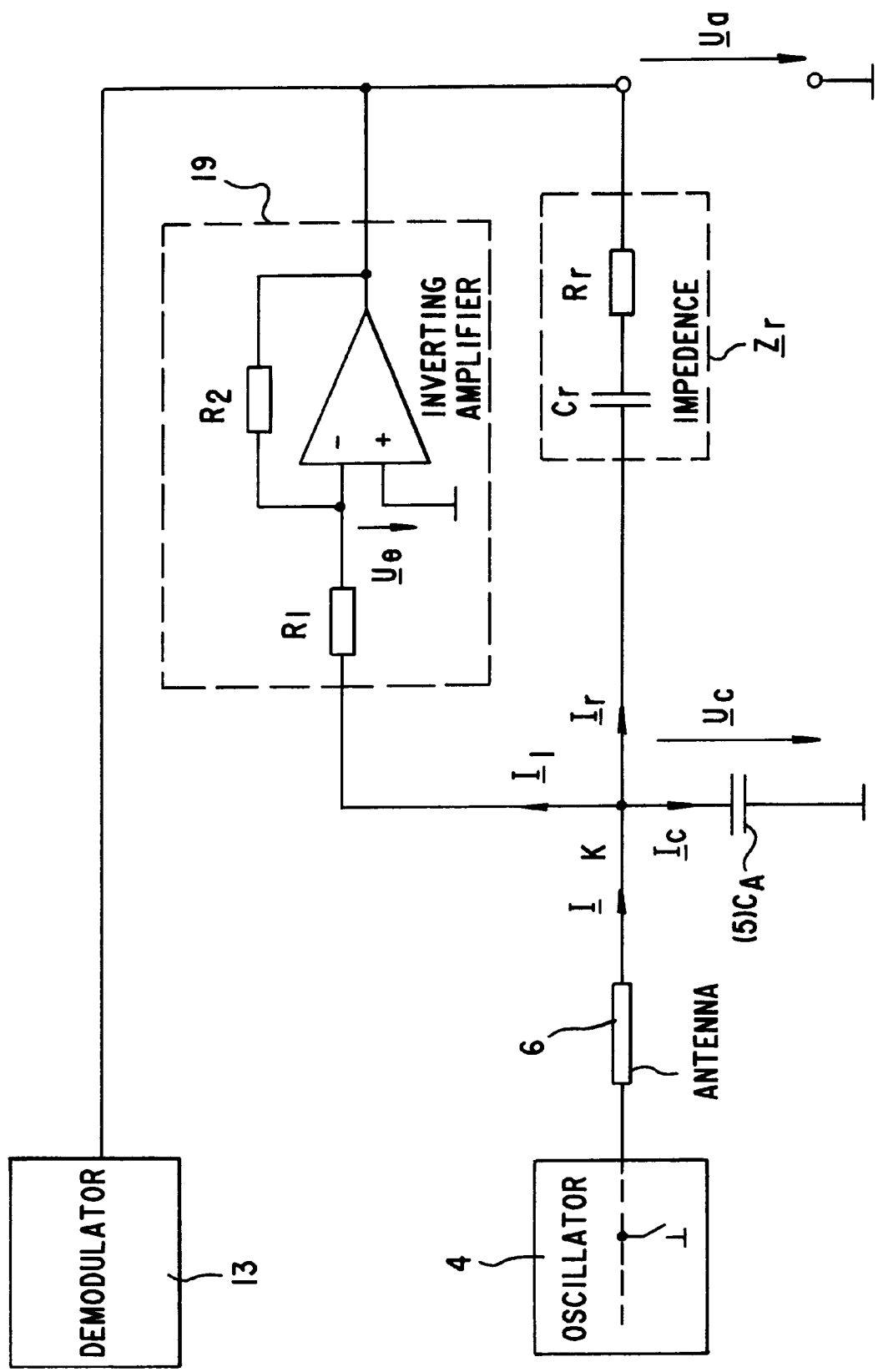
FIG. 4 is a schematic and block diagram of a circuit configuration (substitute circuit diagram) for varying the resonant frequency ($f_{RA}$) of an antenna oscillating circuit.

To that end, an impedance $Z_r$ shown in FIG. 4 is located between an output of a circuit configuration in the form of an inverting amplifier 19 and the antenna capacitor 5. The amplifier 19 and the impedance $Z_r$ are located between the antenna 6 and the capacitor 5 (which is also indicated by reference symbol $C_A$) on one hand and the demodulator 13 on the other hand. The oscillating circuit having the antenna 6 is excited in the charging phase through the oscillator 4 and optionally the frequency divider 15. In the reading phase, the oscillator 4 is inactive and is connected to ground, so that the antenna 6 and the capacitor 5 (also referred to as the capacitor $C_A$ in FIG. 4) act parallel to one another.

The amplifier 19 is constructed as an operational amplifier, having a voltage gain V which is determined by the values of resistors $R_1$ and $R_2$: $V=R_2/R_1$. Depending on the voltage gain V which is established, a different voltage level is applied to the output of the amplifier 19 (output voltage $U_a$) and thus to the impedance $Z_r$. The result is that the impedance $Z_r$ is fed back variously strongly to the antenna oscillating circuit 5, 6, depending on the voltage gain V, and thus acts upon the resonant frequency $f_{RA}$, since the impedance $Z_r$ acts like a parallel circuit to the capacitor $C_A$, which is a component of the antenna oscillating circuit 5, 6 in the transceiver 1.

Through the use of the amplifier 19, a voltage $U_c$ at the antenna capacitor 5 is amplified with a voltage gain $-V$ (since it is an inverting amplifier) to its output voltage $U_a$. Through the use of a feedback through the impedance $Z_r$, an auxiliary current $I_r$ is fed to a node point K. The auxiliary current $I_r$ is proportional to the voltage $U_c$.

As a result, the impedance $Z_r$ acts in weighted fashion upon the capacitor $C_A$ and thus on the antenna oscillating circuit 5, 6. The total impedance of the antenna oscillating circuit 5, 6 varies, and as a result its resonant frequency $f_{RA}$ varies. The antenna oscillating circuit 5, 6 can moreover be additionally damped thereby The shifting of the resonant frequency $f_{RA}$ functions only in the reading phase, if the amplifier 19 is operating in its linear operating range, or in other words if signals of low amplitude (in the range of a few mV) are applied to its input. The amplifier 19 then acts with its voltage gain V parallel to the impedance $Z_r$ on the antenna capacitor $C_A$.

In the charging phase, the amplifier is greatly overdriven, since the energy signals have a voltage value of about 100 V. Then the voltage gain V=0, and the output voltage of the amplifier 19 is at its limits, at approximately ±5 V. Thus only the impedance $Z_r$ then acts parallel to the capacitor $C_A$ upon the antenna oscillating circuit 5, 6.

According to the invention, the resonant frequency $f_{RA}$ is shifted in such a way that it is located approximately in the middle between the low-state and high-state frequencies generated by the frequency modulation by the transponder 2. Thus both in the low state and in the high states approximately the same intensities of the induced voltage are detected The varying of the resonant frequency $f_{RA}$ by varying the total impedance of the antenna oscillating circuit 5, 6 will be described in further detail below with reference to the substitute circuit diagram of FIG. 4 and in terms of Kirchhoff's Law:

A node equation of the currents flowing into the node K between the antenna 6 and the capacitor $C_A$ and out of the node K is as follows:

$$I=I_1+I_r+I_c \qquad (1)$$

Through mesh analysis, the partial currents $I_1$, $I_r$ and $I_c$ are obtained as follows:

$$I_1=U_c/(R_1) \qquad (2)$$

on the assumption that the input voltage $U_e \approx 0$ at the amplifier 19;

$$I_r=(U_a-U_c)/Z_r$$

where the impedance $Z_r$ can be composed arbitrarily of capacitors and/or coils and resistors connected parallel or in series. As an examples the total impedance, which determines the resonant frequency $f_{RA}$, of the antenna oscillating circuit 5, 6 with a connectable impedance $Z_r$ including a series circuit of a resistor $R_r$ and a capacitor $C_r$, is derived as follows: the inverse total impedance=admittance=

$$1/Z_r=Y_r=1(R_r+1/j\omega Cr) \text{ and}$$

with $U_a=-V*U_c$ the current $I_r$ is obtained:

$$I_r=U_c*(1+V)*1/(R_r+1/j\omega Cr) \qquad (3)$$

$$(I_c=U_c*j\omega C_A \qquad (4)$$

in which $C_A$ is the antenna capacitor 5 and $\omega$ is the circuit frequency.

If equations (2) through (4) are inserted into equation (1), then the current I becomes:

$$I=U_c*[1/(R_1)+(1+V)*1/(R_r+1/j\omega C_r)+j\omega C_r)+j\omega C_A] \qquad (5)$$

From equation (5), the total impedance Z or the inverse thereof, namely the admittance Y of the oscillating circuit can be determined:

$$Y=I/U_c 32\ 1/(R_1)+(1+V)*1/(R_r+1/j\omega C_r)+j\omega C_A \qquad (6)$$

If the admittance Y of equation (6) is broken down into its real part ($\text{Re}\{Y\}$) and its imaginary part ($\text{Im}\{Y\}$), then the elements that determine the oscillating circuit become clear:

The real part Re{Y} stands for the oscillating circuit damping, and the imaginary part Im{Y}*1/ω is the total capacitance that results and that determines the resonant frequency $f_{RA}$ in combination with the inductance of the antenna 6. Thus the total impedance of the antenna oscillating circuit 5, 6 depends on the voltage gain V, which can be adjusted through the resistors $R_1$ and $R_2$, as well as on the impedance $Z_r$.

In the case of the invention, it is essential that through the use of this impedance $Z_r$, as a function of the voltage gain V, the oscillation properties and specifically the resonant frequency $f_{RA}$ of the antenna oscillating circuit are varied. In the charging phase, the resonant frequency $f_{RA}$ is shifted only slightly, since the voltage gain V≈0. In the reading phase, a pronounced shift in the resonant frequency $f_{RA}$ occurs, since the voltage gain V>0, for instance V=5.

The voltage gain V may also be varied in predetermined increments or continuously within a predetermined range of gain. This is attained by variable resistors that replace the resistors $R_1$ and $R_2$.

The control or evaluation unit 14 can be in the form of a microprocessor or a functionally equivalent circuit configuration. The function of the demodulator can therefore also be performed by the microprocessor The desired code information, with which the code information furnished by the transponder 2 is compared, is stored in a non-illustrated memory (ROM, EEPROM).

The code information can be stored in the transponder 2, likewise in such memories.

The switch 9 can be in the form of an integrated circuit that also contains the auxiliary capacitor 10. The switch 9 and the auxiliary capacitor 10 may also be included in the transponder IC 12. A coil can also be connected instead of the auxiliary capacitor 10.

In the case of the invention, the frequency range in which the resonant frequencies $f_{RT}$ and $f_{RA}$ are located does not matter. All that is essential is that the resonant frequency $f_{RA}$ of the antenna oscillating circuit 5, 6 in the reading phase be adapted in weighted fashion to a frequency between the two resonant frequencies $f_{RT}$ of the transponder oscillating circuit 7, 8, 10.

I claim:

1. An anti-theft system for a motor vehicle, comprising:
a transceiver to be disposed in a motor vehicle, said transceiver having an antenna oscillating circuit with components including an antenna, said antenna oscillating circuit having a variable transceiver resonant frequency determined by said components for selection to a first resonant frequency and a second resonant frequency;
an oscillator imposing an oscillation on said antenna oscillating circuit for transmitting energy signals;
a portable transponder for transmitting code information to said transceiver, said portable transponder including a transponder oscillating circuit having a variable transponder resonant frequency for selection to a high resonant frequency and a low resonant frequency as a function of the code information, said portable transponder including an energy reservoir for activating said transponder oscillating circuit, said energy reservoir charged by the energy signals;
an evaluation unit receiving the oscillation generated by said transponder and received by said transceiver, said evaluation unit detecting the received oscillation and outputting the code information;
a comparator demodulating and comparing the code information from said evaluation unit with desired code information and issuing a release signal for a security unit if the code information and the desired code information correspond; and
the transceiver resonant frequency of said antenna oscillating circuit selected to the first resonant frequency for transmitting the energy signals and to the second resonant frequency for receiving the code information from said transponder, the second resonant frequency having a value between the high and low resonant frequencies of said transponder oscillating circuit.

2. The anti-theft system according to claim 1, wherein said antenna of said antenna oscillating circuit is a transmitter coil, said antenna oscillating circuit has capacitor connected parallel to said transmitter coil, and including a circuit configuration, and an impedance connected in weighted fashion through said circuit configuration to said antenna oscillating circuit.

3. The anti-theft system according to claim 2, wherein said impedance has a parallel circuit of at least one of a capacitor, a coil and a resistor.

4. The anti-theft system according to claim 2, wherein said impedance has a series and parallel circuit of at least one of a capacitor, a coil and a resistor.

5. The anti-theft system according to claim 2, wherein said impedance has a series circuit of at least one of a capacitor, a coil and a resistor.

6. An anti-theft system for a motor vehicle, comprising:
a transceiver to be disposed in a motor vehicle, said transceiver having an antenna oscillating circuit with components including a transmitter coil, a capacitor connected in parallel to said transmitter coil, an amplifier, and an impedance, said antenna oscillating circuit having a variable transceiver resonant frequency determined by said components for selection to a first resonant frequency and a second resonant frequency, said amplifier having a voltage gain connecting said impedance in a weighted fashion to said antenna oscillating circuit;
an oscillator imposing an oscillation on said antenna oscillating circuit for transmitting energy signals;
a portable transponder for transmitting code information to said transceiver, said portable transponder including a transponder oscillating circuit having a variable transponder resonant frequency for selection to a high resonant frequency and a low resonant frequency as a function of the code information, said portable transponder including an energy reservoir for activating said transponder oscillating circuit, said energy reservoir charged by the energy signals;
an evaluation unit receiving the oscillation generated by said transponder and received by said transceiver, said evaluation unit detecting the received oscillation and outputting the code information;
a comparator demodulating and comparing the code information from said evaluation unit with desired code information and issuing a release signal for a security unit if the code information and the desired code information correspond; and
the transceiver resonant frequency of said antenna oscillating circuit selected to the first resonant frequency for transmitting the energy signals and to the second resonant frequency for receiving the code information from said transponder, the second resonant frequency having a value between the high and low resonant frequencies of said transponder oscillating circuit.

7. The anti-theft system according to claim 6, wherein said amplifier is connected in parallel to said impedance.

* * * * *